UNITED STATES PATENT OFFICE.

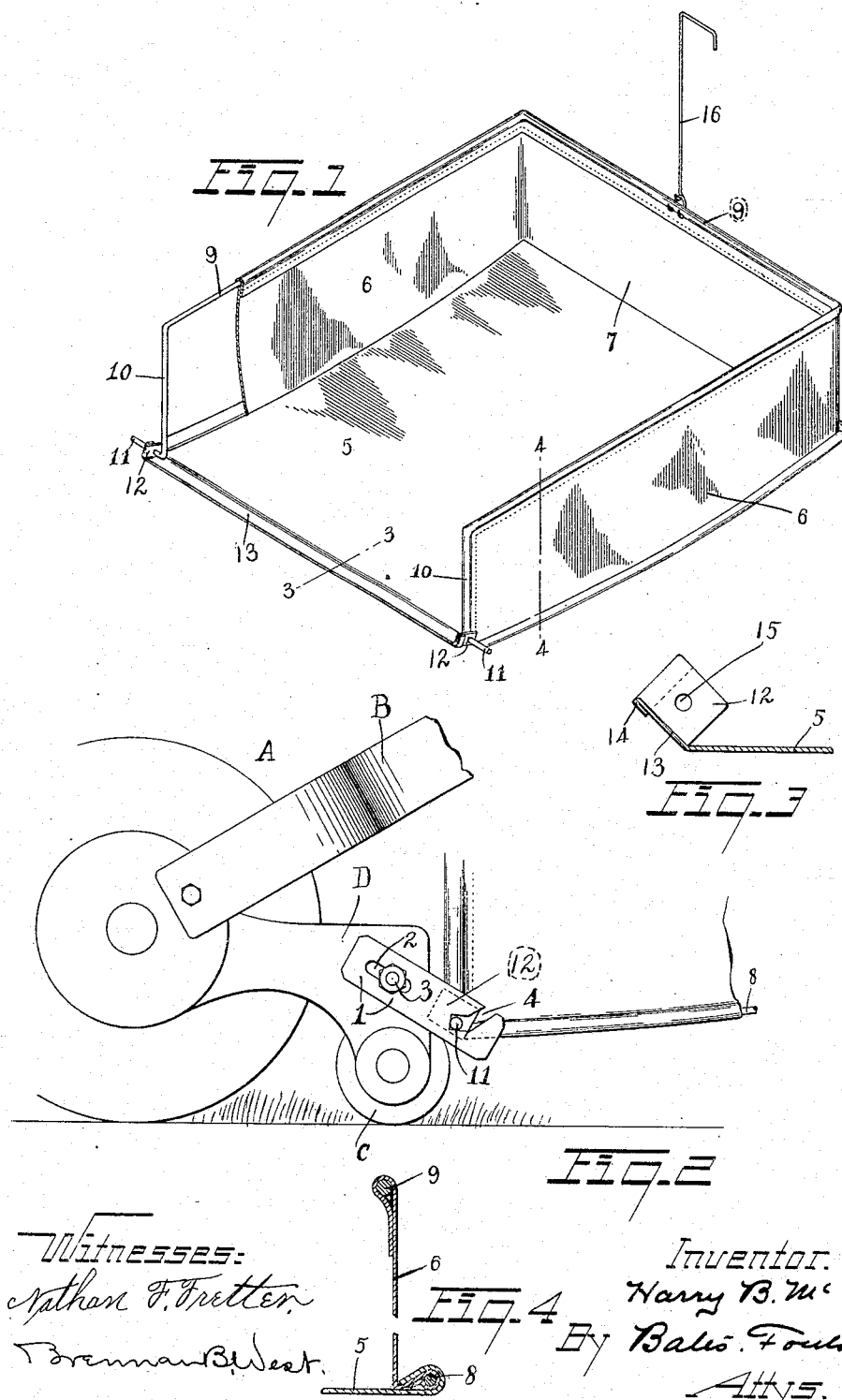

HARRY B. McGRATH, OF EAST CLEVELAND, OHIO.

GRASS-CATCHER.

939,068.	Specification of Letters Patent.	Patented Nov. 2, 1909.

Application filed February 15, 1909. Serial No. 477,941.

*To all whom it may concern:*

Be it known that I, HARRY B. McGRATH, a citizen of the United States, residing at East Cleveland, in the county of Cuyahoga and State of Ohio, have invented a certain new and useful Improvement in Grass-Catchers, of which the following is a full, clear, and exact description, reference being had to the accompanying drawings.

This invention relates to grass-catchers for attachment to lawn mowers, and, generally stated, it has for its object the production of a device of this character which shall be very simple and economical in construction, durable in operation and easy of application to the lawn mower.

In the drawing forming a part hereof, Figure 1 is a perspective view looking into the grass-catcher from the front, the same being disconnected from the lawn-mower; Fig. 2 is a side elevation of a part of the lawn mower and of the front end of the catcher, the same being attached to the mower; Fig. 3 is a sectional view taken on the line 3—3 of Fig. 1; and Fig. 4 is a vertical sectional view taken substantially on the line 4—4 of Fig. 1.

Describing the invention more specifically by reference to the drawings, in which the same reference character refers to the same part throughout the several views, A represents the lawn mower having the side bars B, which connect the lawn mower with the handle, not shown, and C is the rear roller of the lawn mower, the same being journaled in the frame D of the mower.

Attached to the side of the frame D at each end of the machine is a bracket 1, the same being provided toward one of its ends with a longitudinal slot 2 through which extends a bolt 3 having a nut for clamping the bracket to the frame of the mower, the slot 2 permitting the bracket to be adjusted forwardly and rearwardly of the machine. The bracket may also be adjusted radially about the bolt 3 and clamped in any desired position. Toward its other end, the bracket 1 is provided with a slot 4 extending from the upper edge of the bracket downwardly and forwardly, and turning toward its inner end in a forward direction, as shown, and for a purpose hereinafter specified.

The grass catcher is provided with a bottom member 5, which is preferably of sheet metal, such as galvanized iron. The sides 6 and rear end 7 of the catcher are preferably made of some suitable fabric, such as canvas, the lower edges of which are attached to the side and rear edges of the bottom member 5. In Fig. 4 I have shown a desirable way of attaching these parts, from which it will be seen that I stitch the lower edges of the fabric about a wire 8, and bend the edges of the member 5 upwardly and about the said wire and the fabric which is secured thereto. As thus constructed, the lower edge of the fabric is very securely attached to the bottom of the catcher, and by crimping down the turned over portion of the member 5, the wire and the fabric cannot be pulled or torn from their proper positions.

The upper edges of the fabric of the catcher are also stitched about a stiff wire 9, said wire being bent in such manner as to maintain the fabric of the catcher substantially vertical when the catcher is in use. At the front upper corners of the catcher the wire 9 is bent downwardly, as shown at 10, and, near the front lower corners of the catcher, said wire is bent outwardly at substantially right angles, as shown at 11, said portions 11 of the wire extending through apertures in ears 12 that are made integral with or attached to the bottom 5, as shown in Figs. 1 and 3. For the purpose of deepening the catcher and also for the purpose of strengthening the same, the bottom member 5 is turned upwardly toward its front edge, as shown at 13; and, at the extreme front edge of this upturned portion, the metal of the bottom is turned backwardly upon itself at 14, thus again strengthening the front edge of the catcher. The ears 12 are preferably formed integral with the part 13 and extend upwardly, and rearwardly at substantially a right angle therefrom. At 15 in Fig. 3 an aperture is shown through which one of the outturned ends of the wire 9 projects when the parts of the catcher are in assembled condition.

Attached to the wire 9 at the center of the rear of the catcher, is a hook 16, the same being adapted to engage with the handle of the mower, and being of such length as will retain the rear end of the catcher at the desired elevation.

The grass catcher is attached to the lawn mower by simply dropping the projected ends 11 of the wire 9 into the angular slots 4 in the brackets 1 and by placing the hook 16 over the handle, the ends 11 of the wire moving forwardly by gravity in said slots until they seat themselves in the extreme end of the latter. With the wires 11 in the forward ends of the angular slots 4, the catcher is prevented from lifting, and can be removed only by drawing the same rearwardly and lifting upwardly, thus carrying the projected ends 11 of the wire outwardly through the slots in the bracket.

As shown in Fig. 4, the bottom member 5 extends the entire width of the catcher thus leaving no parts of the fabric exposed to wear on the bottom of the catcher.

As stated, the upturned portion 13 of the bottom increases the depth of the catcher and thus adapts it for holding a greater quantity of grass. For still further increasing the capacity of the catcher, I prefer to curve the same downwardly from front to rear, as shown in Fig. 1, the greatest depths of the catcher being at substantially its middle so as to have the grass accumulate at this part of the catcher.

Having thus described my invention, what I claim is:

1. In a grass-catcher, the combination with a sheet metal bottom, of fabric forming the side and rear end of the catcher, said fabric being secured to the bottom by bending the latter over the edges of the fabric, a wire stitched in the upper edge of the fabric, said wire extending downwardly at the front edges of the catcher and thence extending outwardly, and ears secured to the bottom of the catcher, said ears being apertured for the reception of the outturned ends of the said wire, thus forming means for attachment to the lawn mower.

2. In a grass-catcher, the combination with a sheet metal bottom, of fabric forming the side and rear end of the catcher, said fabric being secured to the bottom by stitching a wire in the lower edges of the fabric and by then bending the edges of the bottom over the edges of the fabric, a second wire stitched in the upper edge of the fabric, said second wire extending downwardly at the front edges of the catcher and thence extending outwardly, and ears secured to the bottom of the catcher, said ears being apertured for the reception of the outturned ends of the said second wire, thus forming means for attachment to the lawn mower.

3. In a grass-catcher, the combination with a sheet metal bottom having its front ends extending upwardly and forwardly, of ears integral with said upturned portion of the bottom, said ears being apertured, fabric forming the sides and rear end of the catcher, said fabric being folded at its lower edges and the bottom being turned about the folded edge of the fabric for securing the latter in position, a bent wire stitched in the upper edges of the fabric, said wire being turned downwardly at the front of the catcher opposite the said ears on the bottom and thence turned outwardly and projecting through said ears beyond the sides of the catcher, thus providing means for attachment to the lawn mower.

4. In a grass-catcher, the combination with a sheet metal bottom having its front ends extending upwardly and forwardly, of ears integral with said upturned portion of the bottom, said ears being apertured, fabric forming the sides and rear end of the catcher, a wire stitched in the lower edges of the fabric, the bottom being turned about the said wire and the lower edges of the fabric for securing the latter in position, a second wire stitched in the upper edges of the fabric, said latter wire being turned downwardly at the front of the catcher opposite the said ears on the bottom and thence turned outwardly and projecting through said ears beyond the sides of the catcher, thus providing means for attachment to the lawn mower.

5. The combination with a lawn mower, of slotted brackets adjustably secured thereto, the slots extending downwardly and forwardly and being bent toward their forward ends, a grass-catcher having bottom, side and rear end members, a bent wire surrounding the upper edges of the side and rear end member and extending downwardly at the front of the catcher and thence outwardly beyond the catcher, the projecting ends of said wire fitting in the slots in the said brackets, for the purpose specified.

6. In a grass-catcher, the combination with a metallic bottom, said bottom being curved from front to rear, of a fabric forming the sides and rear end of the catcher, said fabric being secured at its lower edges to the edges of the said bottom, a bent wire secured to the fabric at its upper edges, said wire extending downwardly at the front of the catcher, and thence outwardly beyond the sides of the catcher, and ears integral with said bottom member, said ears having apertures through which the projecting ends of the said wire extend, the said ends of the wire forming means for attachment to the lawn mower.

7. In a grass catcher, the combination with a metallic bottom, said bottom being turned upwardly and forwardly and then folded back upon itself at the front edge, of ears integrally secured to the ends of the said turned portion of the bottom, said ears projecting upwardly and rearwardly, fabric forming the sides and rear end of the catcher, said fabric being secured to the bottom at its side and rear edges, a bent wire secured to the upper edges of the fabric, said wire turning downwardly at the front end of the catcher and thence outwardly and projecting through the said ears, the projecting ends of the wire forming means for attachment of the catcher to the lawn mower.

In testimony whereof, I hereunto affix my signature in the presence of two witnesses.

HARRY B. McGRATH.

Witnesses:
 CURT B. MUELLER,
 S. E. FOUTS.